W. W. St John,
Well Tubing.

N° 51,980.  Patented Jan. 9, 1866.

Witnesses:
S. D. Richardson
S. H. Slosson

Inventor:
Wm W. St John

UNITED STATES PATENT OFFICE.

WILLIAM W. ST. JOHN, OF SYRACUSE, NEW YORK.

IMPROVED DRILL-HEAD.

Specification forming part of Letters Patent No. 51,980, dated January 9, 1866.

*To all whom it may concern:*

Be it known that I, WILLIAM W. ST. JOHN, of Syracuse, county of Onondaga, and State of New York, have invented a new and Improved Hollow Drill-Head for Artesian Wells; and I do hereby declare that the following is a full and exact description thereof, reference being had to the accompanying drawings, and to the letters of reference marked thereon, in which—

Figure 1:
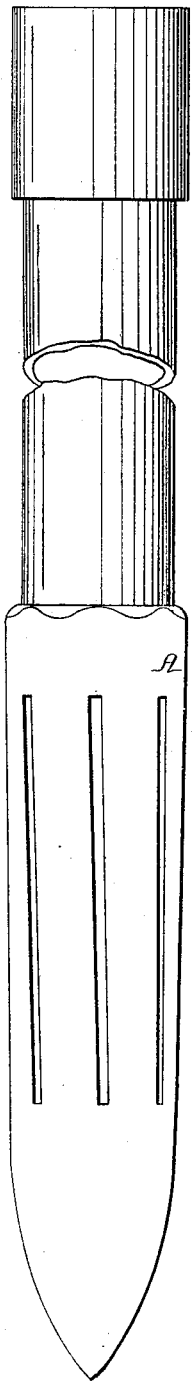
Figure 2:
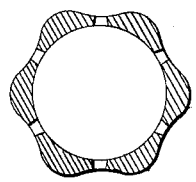

Figure 1 is a vertical elevation; Fig. 2, a cross-section.

To enable others skilled in the art to make and use my invention, I will proceed to describe its construction and operation.

I construct my drill-head of malleable iron or other suitable material, with a corrugated surface in the form of a left-hand screw, thereby enabling it to be driven with greater ease and keeping it in a straight line, which also tends to tighten the joints above, as it will turn once around in being driven fifteen feet. The said drill-head is constructed the same size as the couplings above, thereby enabling the pipe to be driven without friction, as the drill-head will make a track for the couplings on the pipe above. The slits or apertures in the drill-head are constructed larger on the inside surface than on the outer, thereby preventing, in a great degree, the slits or apertures from filling up, and said slits or apertures can be made fine or coarse, as the soil may require, and can be made in as many sections as desirable. The drill-head is constructed sufficiently strong to be driven into the ground, and when down is a component part of the well.

What I claim as new, and desire to secure by Letters Patent, is—

A hollow drill-head provided with apertures, constructed as described, and with external corrugations arranged in the form of a left-hand screw, substantially as set forth.

WM. W. ST. JOHN.

Witnesses:
 S. H. SLOSSON,
 D. BOOKSTAVN.